US007695265B2

(12) United States Patent
Towfigh et al.

(10) Patent No.: US 7,695,265 B2
(45) Date of Patent: Apr. 13, 2010

(54) APPARATUS FOR COATING A ROLL CORE

(75) Inventors: Payam Towfigh, Winnipeg (CA); Jon P. Derwin, Poplar Point (CA); John K. O'Connor, Winnipeg (CA); Loc V. Pham, Winnipeg (CA); Terry W. Roschuk, Winnipeg (CA)

(73) Assignee: StateMix Ltd., Winnipeg, Manitoba (CA)

( * ) Notice: Subject to any disclaimer, the term of this patent is extended or adjusted under 35 U.S.C. 154(b) by 709 days.

(21) Appl. No.: 11/551,022

(22) Filed: Oct. 19, 2006

(65) Prior Publication Data

US 2008/0011410 A1      Jan. 17, 2008

Related U.S. Application Data

(60) Provisional application No. 60/728,085, filed on Oct. 19, 2005.

(51) Int. Cl.
*B29C 39/10* (2006.01)
(52) U.S. Cl. ............................ 425/127; 249/61; 249/90; 156/429; 425/135; 425/175; 425/176; 425/182
(58) Field of Classification Search .................... 425/63, 425/64, 110, 117, 127, 135, 175, 176, 182; 156/425, 429; 249/61, 90
See application file for complete search history.

(56) References Cited

U.S. PATENT DOCUMENTS

| | | | | |
|---|---|---|---|---|
| 2,605,533 | A | * | 8/1952 | Hirsh, Jr. ..................... 425/110 |
| 3,439,075 | A | * | 4/1969 | Bauer et al. ................. 264/46.7 |
| 5,441,219 | A | | 8/1995 | Rauscher, Jr. |
| 5,871,117 | A | | 2/1999 | Protasov et al. |
| 6,190,481 | B1 | | 2/2001 | Iida et al. |
| 6,206,994 | B1 | | 3/2001 | Shieh et al. |

(Continued)

FOREIGN PATENT DOCUMENTS

WO       WO 92/16355       1/1992

OTHER PUBLICATIONS

Peters, S.T., "Handbook of Composites", 1998, pp. 456-471, Chapman & Hall, London, UK., second edition.

*Primary Examiner*—Robert B Davis
(74) *Attorney, Agent, or Firm*—Duane Morris LLP (57) ABSTRACT

There is described a method and apparatus for covering a cylindrical roll core with an elastomeric material, the roll core having a longitudinal axis of rotation and an outer surface for receiving the elastomeric material thereon, the apparatus comprising a pair of opposed vertically aligned rotatable chucks for receiving and securing the roll core therebetween for rotation of the roll core about its longitudinal axis, the chucks holding the roll core vertically stationary, a dispenser for helically winding a length of flexible tape around the roll core from the bottom to the top thereof in spaced apart relation to the roll core's outer surface to form a containment sheath defining an annular space between the outer surface and said tape, said tape being wound in response to rotation of the roll core by the chucks, a mixing head for discharging the elastomeric material into the annular space concurrently with the space's formation as the flexible tape is wound around the roll core, a support for the dispenser and the mixing head for vertical movement thereof relative to the roll core and a motor driven elevator for controllably moving the support up and down relative to the roll core.

22 Claims, 9 Drawing Sheets

U.S. PATENT DOCUMENTS

| | | |
|---|---|---|
| 6,206,995 B1 | 3/2001 | Lauderbaugh |
| 6,435,244 B1 | 8/2002 | Shieh et al. |
| 6,514,369 B1 | 2/2003 | Shieh |
| 6,776,744 B1 | 8/2004 | Shieh |

* cited by examiner

APPARATUS FOR COATING A ROLL CORE

CROSS-REFERENCE TO RELATED APPLICATIONS

This application claims the benefit of U.S. Provisional Patent Application No. 60/728,085, filed Oct. 19, 2005.

FIELD OF THE INVENTION

The present invention relates to a method and apparatus for covering a roll core with thermoset material such as polyurethane silicone and/or epoxy.

BACKGROUND

Covered rolls are utilized in many applications including an application known as calendering. Calendering is the act of pressing a material, e.g., cloth, rubber or paper, between rollers or plates in order to smooth the material into sheets. Covered rolls are precision elements and therefore must be precisely manufactured to achieve specific size and shape specifications with tight tolerances. For many applications, covered rolls must also have high temperature and pressure resistance. For example, covered rolls are used in paper mills for calendering paper-web material into specific grades of paper, often under severe conditions.

Prior art calender rolls comprise a metal cylinder to which a synthetic composite roll cover is added to preclude metal-on-rolled-material-on-metal contact at the nip between calender rolls during a calendering operation. Most of these synthetic composite roll covers use some form of extrudable thermoplastic material or a thermoset resin such as epoxy, silicone rubber or polyurethane as a base material, which is combined with some form of reinforcement material to improve strength.

More recently, roll covers have been fabricated out of non-composite thermoplastic and thermoset materials. Many thermoset materials in particular have highly desirable properties making them superior to synthetic composite materials. These properties include higher tensile strength, greater smoothness, higher impact strength, more uniform surface finish and more homogenous physical and thermal properties.

U.S. Pat. No. 6,206,994 discloses a method and apparatus for the fabrication of rolls covered with high performance thermoplastic materials. The disclosed apparatus comprises a mold tape dispenser and a thermoplastic extruder located on a turntable. In operation, a roll core, vertically oriented, is lowered through the center of the turntable. As the roll core is lowered, the turntable rotates concentrically around the non-rotational roll core. The rotation of the turntable winds tape helically around the lowering roll core, the tape being spaced a predetermined distance from the roll core. Between the tape and the roll core, the turntable rotation winds an extruded thermoplastic filament helically onto the role core. When the entire roll core has been lowered through the turntable, the roll core is covered with thermoplastic filament.

The above described patent discloses a large and unwieldy apparatus with numerous moving components. During operation of the apparatus, a substantial proportion of the apparatus is in motion: the roll core must be lowered and raised a distance equivalent to at least the length of the roll core; and all of the thermoplastic material application equipment must be rotated around the roll core. Besides being difficult to manufacture and maintain, the moving components of the apparatus also consume considerable energy.

The apparatus disclosed by Pat. No. 6,206,994 also occupies considerable space. To accommodate the apparatus, a space with a height at least two times the length of a roll core is required.

In light of the above, there is a need for a less complicated method and apparatus, with greater space efficiency and energy efficiency, for covering a roll core with a polymeric material.

SUMMARY

It is an object of the present invention to provide a method and apparatus that mitigates the above disadvantages of the prior art.

The object of the present invention is achieved by providing a novel and inventive method and apparatus for covering a roll core with thermoset material such as polyurethane. The method includes first providing a cylindrical roll core having two ends, a length, and an outer surface. A spacer assembly is attached proximate one end of the roll core, the spacer assembly having a circumference greater than that of the roll core. The roll core is then aligned in a substantially vertical orientation and held in place by suitable fixtures operable to rotate the roll core, e.g., opposed universal chucks that are motorized to rotate the roll core at a predetermined speed. Starting with the spacer assembly located at the bottom of the roll core, a length of mold tape is helically wound around the length of the roll core in a spaced-apart relationship therewith to define an application annulus between the mold tape and the roll core outer surface. As the roll core and the progressively formed sheath of mold tape rotate, liquid polyurethane is poured into the application annulus such that a pool of liquid polyurethane forms, contained between the mold tape and outer surface of the roll core. The mold tape maintains the polyurethane in contact with the roll core surface prior to the polyurethane solidifying. After the polyurethane hardens, the mold tape is removed.

According to the present invention then, there is provided an apparatus for covering a cylindrical roll core with an elastomeric material, the roll core having a longitudinal axis of rotation and an outer surface for receiving said elastomeric material thereon, the apparatus comprising a pair of opposed vertically aligned rotatable chuck means for receiving and securing said roll core therebetween for rotation of said roll core about its longitudinal axis, said chuck means holding said roll core vertically stationary; means for dispensing and helically winding a length of flexible tape around said roll core from the bottom to the top thereof in spaced apart relation to said roll core's outer surface to form a containment sheath defining an annular space between said outer surface and said tape, said tape being wound in response to rotation of said roll core by said chuck means; discharge means for discharging said elastomeric material into said annular space concurrently with said space's formation as said flexible tape is wound around said roll core; support means for said means for dispensing and said discharge means for vertical movement thereof relative to said roll core; and motor driven means for controllably moving said support means up and down relative to said roll core.

According to the present invention then, there is also provided a method of covering a cylindrical roll core with an elastomeric material, said roll core having a longitudinal axis of rotation and an outer surface for receiving said elastomeric material thereon, the method comprising the steps of vertically orienting said roll core for rotation about its said longitudinal axis; winding a length of flexible tape about said roll core from the bottom to the top thereof in spaced apart relationship from said outer surface in response to rotation of said roll core to form a containment sheath defining an annular space between said outer surface and said tape; discharging said elastomeric material into said annular space as said containment sheath is formed by said winding of said flexible tape from the bottom to the top of said roll core; allowing said elastomeric material to harden into a continuous covering of said roll core's outer surface; and removing said tape to expose said hardened elastomeric material.

According to the present invention then, there is also provided a method of forming a containment sheath around a cylindrical core for a liquid used to coat the core, said core having a longitudinal axis of rotation and an outer surface to be coated, said method comprising the steps of vertically orienting said core for rotation about its longitudinal axis; securing said core to be vertically stationary; coaxially attaching a circular spacer means to at least a lower end of said core, the diameter of said spacer means exceeding the diameter of said core; attaching a leading end of a continuous length of flexible tape to said spacer means and wrapping said tape around said spacer means at least once to define a lower edge of said containment sheath, said tape being supplied from a source of said tape; simultaneously rotating said core and vertically elevating said source of tape so that said tape is helically wound around said core to form said containment sheath, the core's outer surface and the containment sheath being spaced apart to form an annular space therebetween, said annular space being adapted to receive therein the liquid for coating said roll core's outer surface.

DESCRIPTION OF THE DRAWINGS

Preferred aspects of the present invention will now be described in greater detail and will be better understood when read in conjunction with the accompanying drawings in which.

DETAILED DESCRIPTION OF A PREFERRED EMBODIMENT

Figure 1:
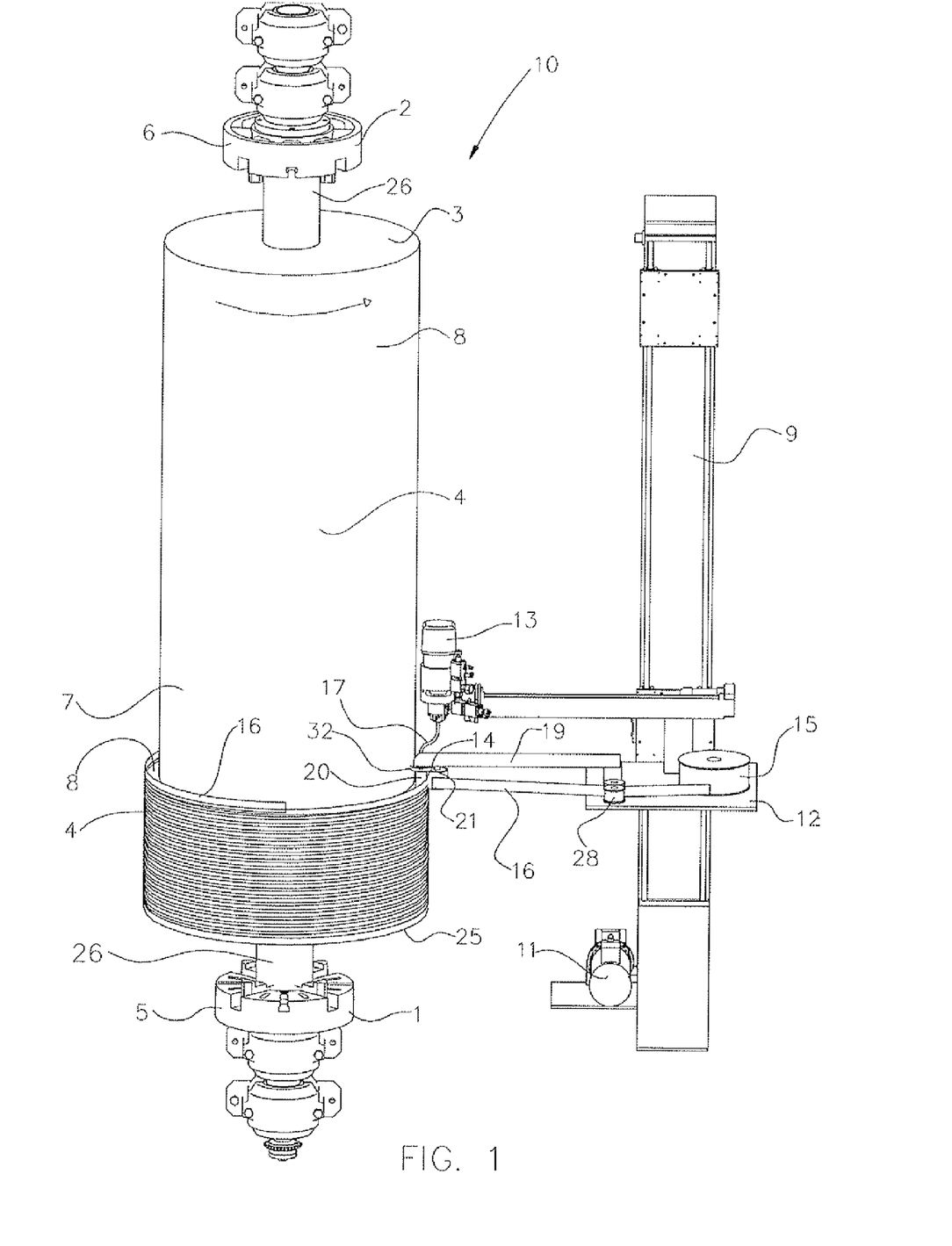
FIG. 1 is a side view of the apparatus of the present invention for coating a roll core.
Figure 2:
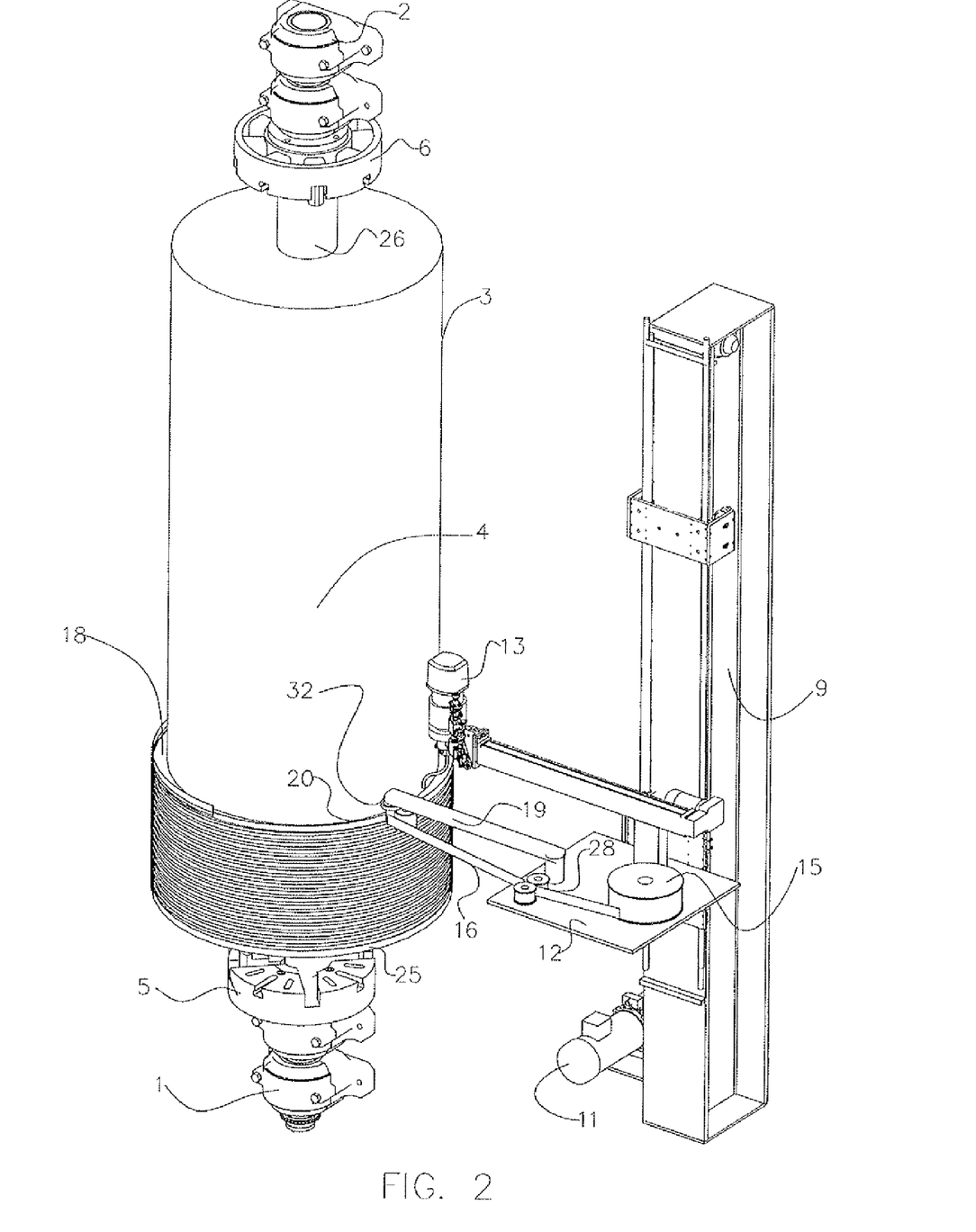
FIG. 2 is a perspective view of the apparatus of FIG. 1.

Referring now to FIG. 1 and FIG. 2, wherein like reference numerals refer to like elements, there is shown at 10 in FIG. 1 an apparatus for applying a polyurethane coating to a roll core which will typically be manufactured of metal. In the following detailed description, the invention is described with respect to the use of polyurethane, which is a thermoset material, to coat the roll core. It will be understood however that the invention is not limited to the use of thermoset resins, and the applicant contemplates the use of other polymeric coatings, including thermoplastic materials that are normally applied by extrusion processes.

The apparatus is arranged for vertically orienting a metal roll core and applying a layer of polyurethane to the outer surface thereof to form a covered roll such as a large calender roll or supercalender roll. These rolls are used in industrial environments such as steel mills or paper mills where the rolls can be used for example to transport a web sheet of paper through a paper machine to produce finished paper.

In the embodiment of the invention shown in FIG. 1, the roll core 3 is a conventional roll core that may be purchased from a roll core manufacturer to desired specifications relating to its length, diameter and so forth.

The apparatus includes bottom and top rotatable chuck assemblies 1 and 2 respectively. Bottom rotatable chuck assembly 1 comprises an upwardly facing universal chuck 5. Top rotatable chuck assembly 2 comprises a downwardly facing universal chuck 6.

Roll core 3 with exposed outer surface 4 is shown disposed between upwardly facing universal chuck 5 and downwardly facing universal chuck 6 which are adapted to clamp onto the exposed ends of the roll core's axle 26. When aligned vertically between the chucks, the roll core comprises a bottom end 7 and a top end 8. Chucks 4 and 5 are motorized so that roll core 3 can be rotated at a speed selected having regard to the core's diameter, the rate at which the coating is to be applied and other factors determined by the operator.

The universal chucks are aligned to assure substantially vertical orientation of roll core 3. The roll core 3 is of a predetermined length and is generally cylindrical in shape and includes a central axis and an outer surface 4 formed of any suitable material, e.g., metal.

A first spacer assembly 25 is attached to the bottom end 7 of roll core 3. First spacer assembly 25 comprises in one embodiment contemplated by the applicant a rigid disk that can be conveniently cut from plywood. The outer diameter of the disk will exceed the outer diameter of roll core 3 and the difference in diameters will accommodate the width of the desired annulus between mold tape 16 and the core's outer surface 4.

Apparatus 10 includes an elevator assembly 9 located adjacent to roll core 3. Elevator assembly 9 supports a motor 11 and a platform assembly 12. Platform assembly 12 can be raised and lowered on the elevator using motor 11 with an interconnecting drive means which can be mechanical, hydraulic or pneumatic.

Platform assembly 12 is mounted to elevator assembly 9. As seen in the drawings, several devices are mounted onto or supported by the platform assembly. These devices include a mixing head 13 for mixing of the liquid polyurethane, a master spacer assembly 14, and a mold tape dispenser 15 for dispensing a length of mold tape 16 spooled thereon.

The mixing head 13 operates in a manner that will be known to those skilled in the art. Internally the head includes a dynamic mixing blade that blends liquid prepolymer and a curative which is used to solidify the polyurethane after mixing and pouring. The mixed material is discharged as a liquid from the mixing head through a mixer hose 17 and poured into the application annulus 18 between the roll core outer surface 4 and the surrounding sheath of mold tape as will be described in greater detail below. As will be known in the art, a catalyst can be added to the mixture to accelerate the time for the polyurethane to cure.

The master spacer assembly 14 comprises a spring loaded arm 19, a master spacer wheel 20 and a spacer slave wheel 21. The spring loaded arm operates to keep the master spacer wheel biased against roll core outer surface 4.

The mixing head 13 is off the shelf technology, and if desired several different polymeric materials and catalysts can be combined within it for mixing.

The process for applying polyurethane to the outer surface of the roll core 3 will now be discussed in detail to exemplify the method and apparatus of the invention.

As shown in FIGS. 1 and 2, a roll core 3 to receive a polyurethane cover is secured between the top and bottom rotatable chuck assemblies. Prior to this step, the roll core will have been stripped of remaining polyurethane from any previous coating and cleaned and prepared for the new coating as is known in the art. The preparation stage can include heating the roll core for improved adhesion between the roll core and the polyurethane.

Next a "start-up process" is performed. Generally speaking, during start-up, the rotatable chuck assemblies are rotated while the elevator assembly stays in the lowered position.

To perform the "start-up," a leading edge of mold tape 16 is unspooled from mold tape dispenser 15 and is threaded through pinch rollers 28 and then between master spacer wheel 20 and slave wheel 21 before being attached to the outer edge of spacer disk 25 by any suitable means, e.g. adhesive on the mold tape's inner surface, a clip or even a tack or nail.

Rotation of the roller core is started with the elevator assembly 9 remaining in the lowered position to wind mold tape 16 around spacer disk 25 once or twice to ensure a strong connection to the disk and to build up a predetermined amount of tension in the tape. The start-up procedure is then complete.

Next, to build the urethane layer, the elevator assembly 9 is activated which causes the platform assembly 12 to be slowly raised from its lowered position. Upward movement of the platform assembly 12 may be at any suitable rate, e.g., 0.50 inches per rotation of the roll core. Rotational movement of the roll core 3 causes the mold tape dispenser to release the mold tape 16 for application around the roll core 3 at a distance from the roll core's outer surface 4 which may be equal to or determined by the diameter of master spacer wheel 20. Wheel 20 is removably and rotatably connected to the end of spring loaded arm 19. This allows wheels of different diameters to be used depending on the desired width of annulus 18 and also permits the wheels to rotate as they traverse outer core surface 4 as the roll core rotates. In the embodiment shown in FIGS. 1 and 2, spacer wheel 20 incorporates an upper circular flange 32 that bears against outer core surface 4 to cause the spacer wheel to rotate. In this embodiment therefore, the width of annulus 18 will not be equal to the diameter of wheel 20 but will instead be equal to the distance between the most distal point of the wheel from surface 4.

Raising of the platform assembly 12 upwards along the elevator assembly 9 causes mold tape 16 to be wound helically in an overlapping manner over the length of the roll core 3 from the bottom 7 to the top 8 thereof. The amount of overlap is determined by the rate of upward movement of the platform assembly 12 per rotation of the roll core, and the width of the tape used.

The mold tape 16 can be formed of any suitable material, e.g., aluminium tape, metallic strap, fibre tape, and may be of any suitable width, e.g., approximately two inches and any suitable thickness, e.g., 0.005 inches.

Since the circumference of spacer disk 25 is greater than that of the roll core itself, and master spacer wheel 20 keeps the mold tape away from roll core outer surface 4 as described above, mold tape 16 actually winds over the length of roll core 3 in a spaced-apart relationship with outer surface 4 to form a containment sheath 14 or sleeve for the polyurethane. In other words, the in-coming mold tape 16 does not contact outer surface 4 of roll core 3 but rather forms application annulus 18.

Application annulus 18 is defined by the space between the inside surface of the helically wound mold tape 16 and roll core outer surface 4.

While the mold tape 16 forms the application annulus 18, mixing head 13 simultaneously pours a polyurethane mixture with or without catalyst therein. The mold tape 16 acts as a wall to prevent escape of the polyurethane prior to hardening. Rotational movement of chuck assembles 1 and 2 causes the horizontally stationary mixer head 13 to evenly distribute the polyurethane into application annulus 18. That, combined with the raising of platform assembly 12 from the lowered position to the elevated position on elevator assembly 9 causes the application annulus 18 to be filled uniformly as the annulus forms. A nozzle (not shown) can be added to the discharge end of mixer hose 17, the nozzle having an orifice shaped and/or sized to reduce the likelihood of bubbles in the discharged polyurethane.

Once application annulus 18 has been formed around the full length of roll core 3 and the annulus has been filled with polyurethane by mixing head 13, the polyurethane mixture is allowed to cure or harden. Once the hardening is complete, the covered roll can be removed from the universal chucks and the mold tape 16 removed from the hardened polyurethane. Spacer disk 25 is also removed from the bottom of the finished covered roll. Mold tape 16 can be machined away as part of the same machining process used to finish the polyurethane covering to final tolerances.

In the embodiment diskussed above, tape 16 self dispenses in reaction to the rotation of roll core 3. However, depending upon the nature of the tape being used, this could cause distortions in the shape of the sleeve formed by the tape. It may be preferable therefore with some tapes to actually feed them out, such as by motorizing tape dispenser 15 itself, or by motorizing the pinch rollers or spacer wheel, with mechanical or computerized calibration of the tape speed to the rate of roller rotation. As well, in place of or in addition to the use of spacer wheel 20 to space the tape from the roll core's outer surface 4, the present system can be adapted to utilize laser alignment for more precise positioning of the tape.

The rotational speed of roll core 3 will typically be in the range of 1 to 10 rpm but could be as high as 30 to 40 rpm for small diameter rolls. Generally, the larger the roll's diameter, the slower the rotational speed. Also subject to rotational speed, the polyurethane will be poured into containment annulus 18 at a rate of 1 to 10 pounds per minute, although this is not limitative, and rates could be higher or lower.

Reference will now be made to FIGS. 3 to 9 illustrating another embodiment of the present invention adapted for use with tapes that have a peelable backing. In FIGS. 3 to 9, like numerals have been used to identify like elements.

As mentioned above, mold tape 16 can be formed of any suitable material such as aluminum foils or fiber but such tapes can be expensive. Paper or coated paper tapes with a peelable backing are relatively inexpensive and readily available. These tapes are typically of the same material used for adhesive labels and similar applications. These tapes have a peelable backing coated with a release material to prevent adhesion to the glue applied to the sticky side of the tape. As will be appreciated, when using such tapes, it is necessary to have a take-up reel for the backing strip. As well, the applicant has developed an alternative to spacer wheel 20 which allows for more flexibility in terms of eliminating the need for different sized wheels depending on the required size of annulus 18 formed between the mold tape and the roll core.

Figure 3:
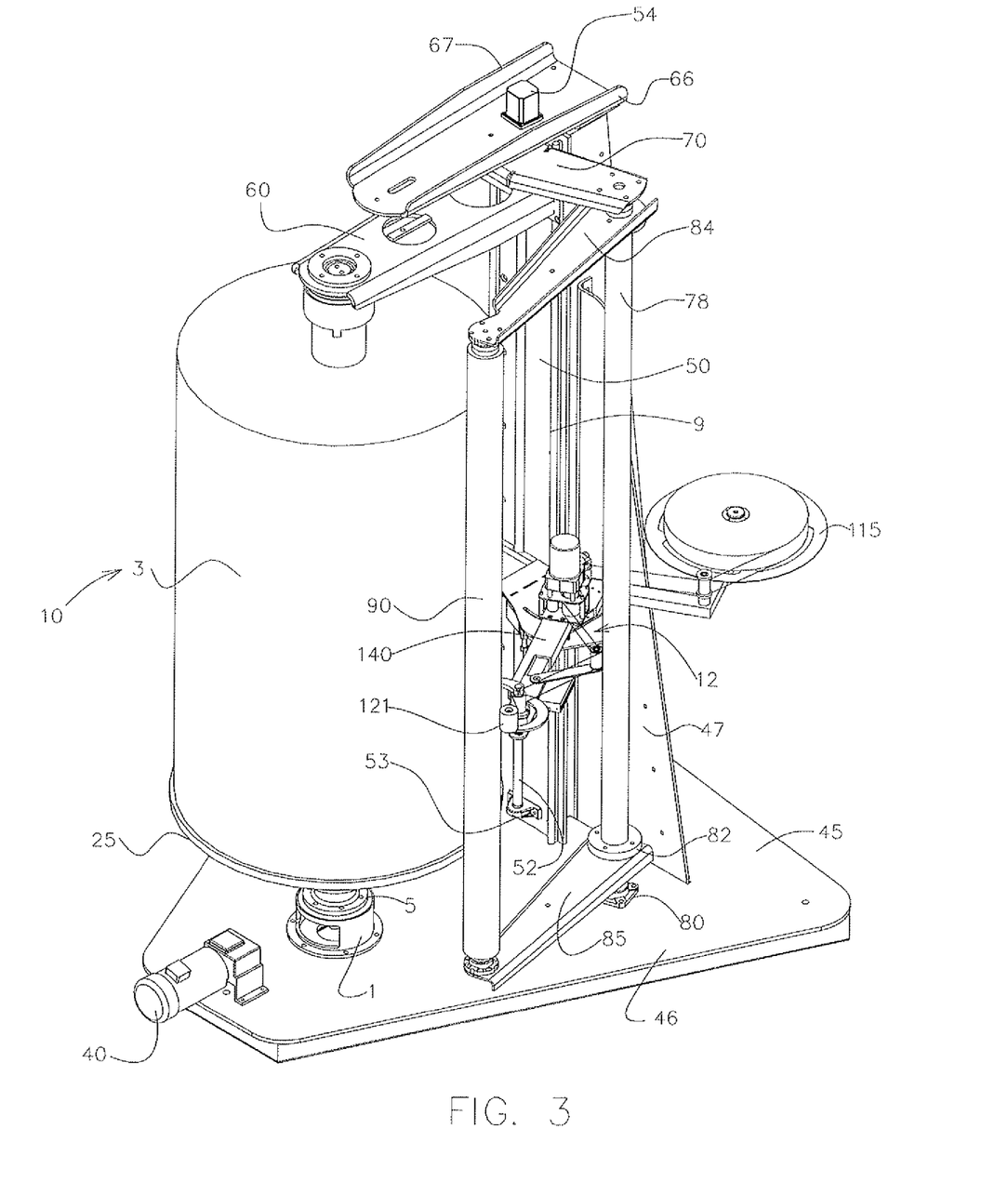
FIG. 3 is a front perspective view of a second embodiment of the apparatus of the present invention for coating a roll core.
Figure 4:
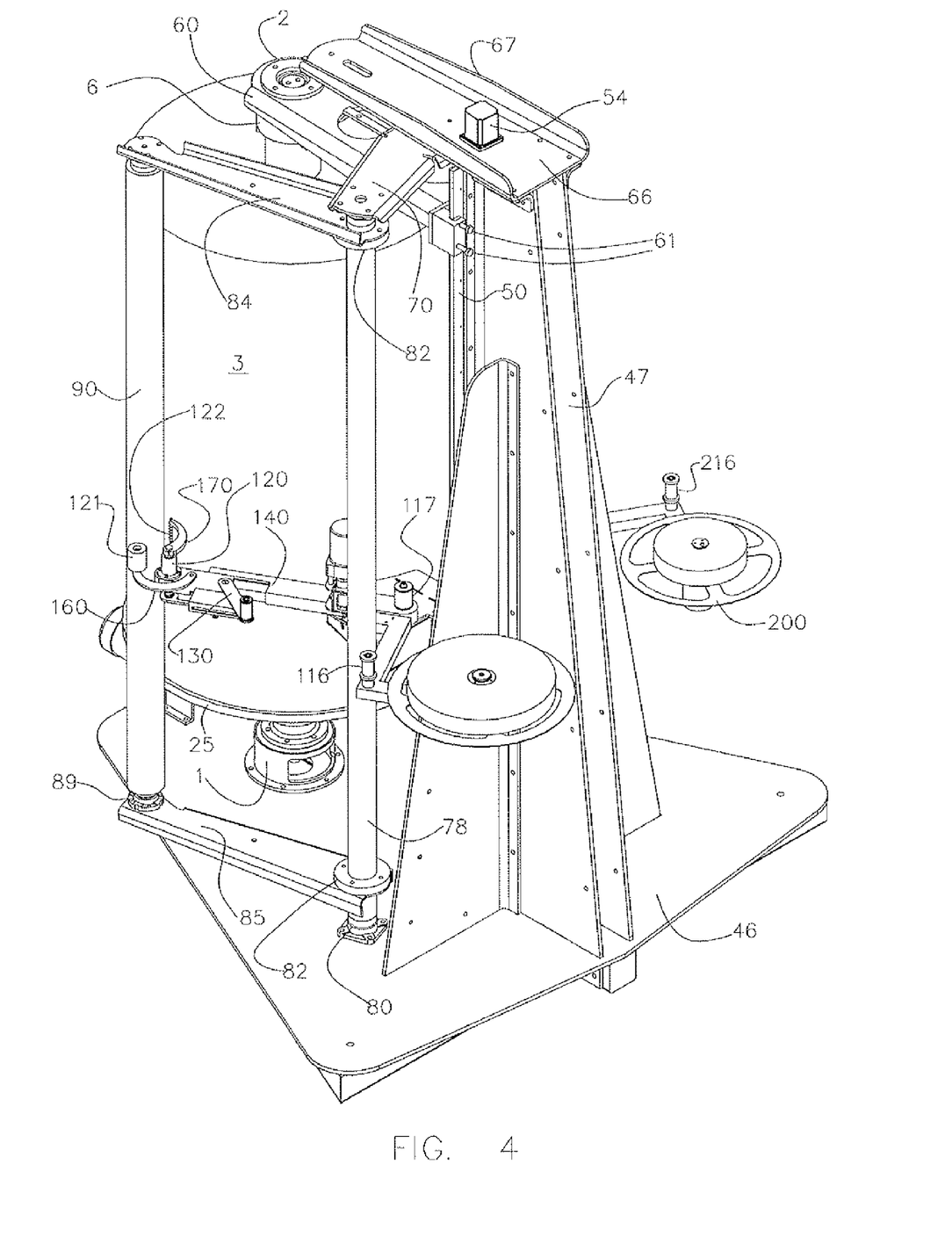
FIG. 4 is a rear perspective view of the apparatus of FIG. 3.
Figure 5:
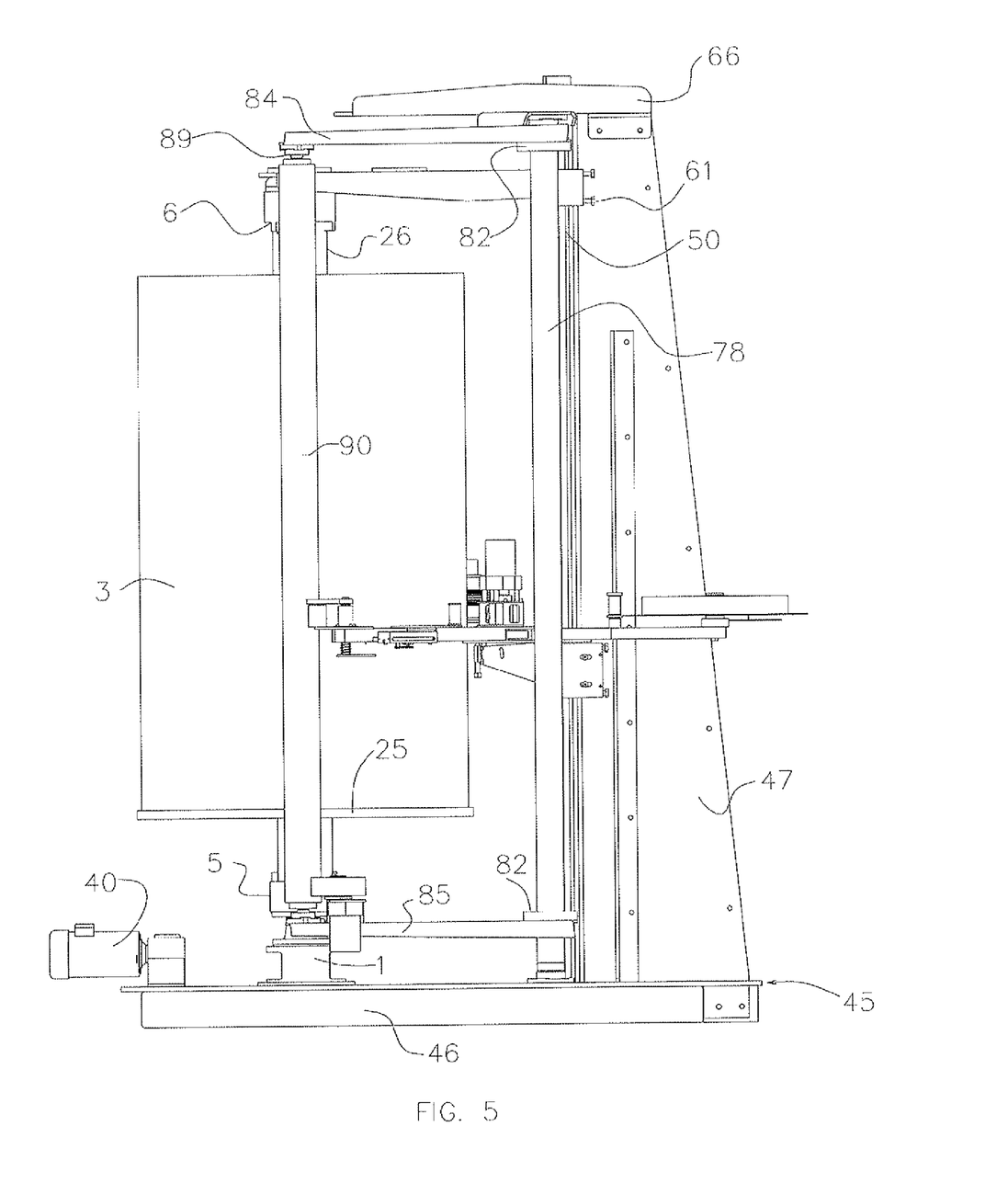
FIG. 5 is a side elevational view of the apparatus of FIG. 3.
Figure 6:
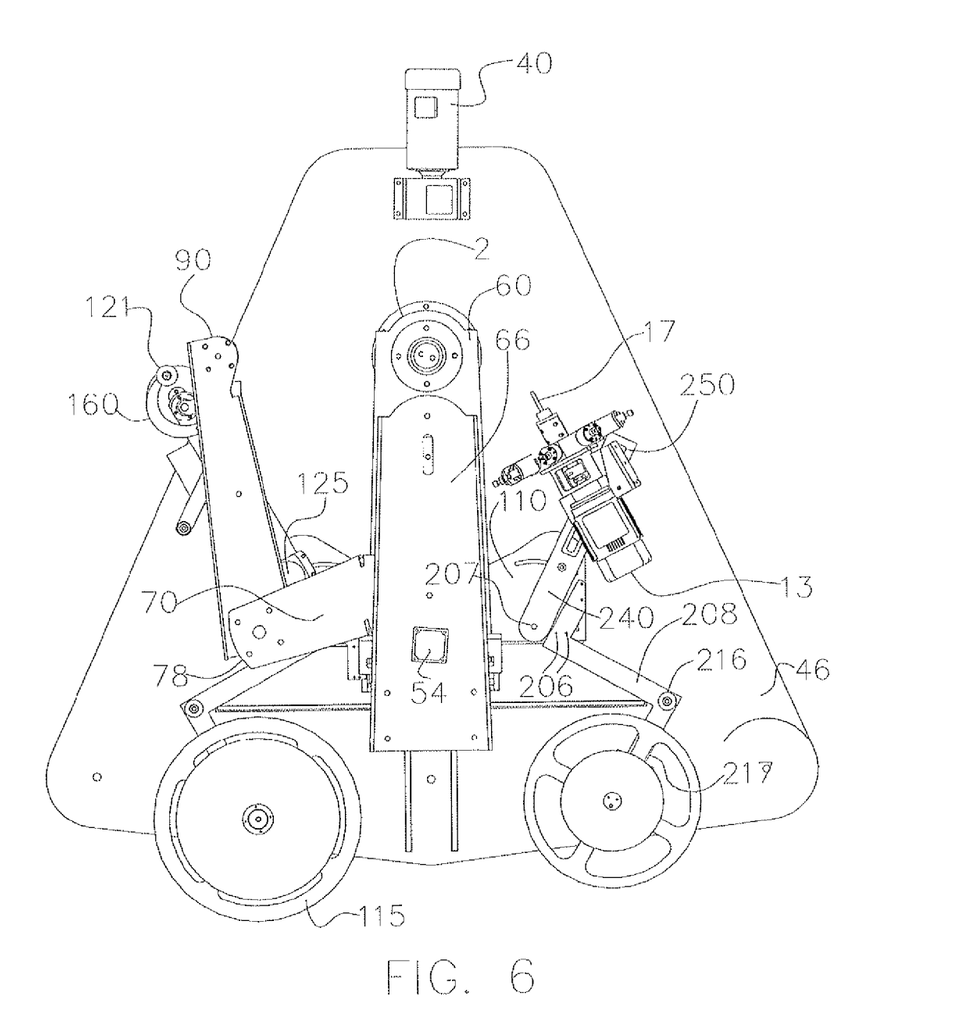
FIG. 6 is a top plan view of the apparatus of FIG. 3.

With reference to FIGS. 3 and 4, the basic configuration of roll core coating apparatus 10 remains the same with roll core 3 being held vertically stationary and rotatably suspended between bottom and top chuck assemblies 1 and 2 respectively having opposed universal chucks 5 and 6 driven by an electric motor 40. The apparatus as a whole is supported by a frame 45 consisting of a base 46 and a braced tower 47. Elevator assembly 9 comprises a vertically aligned metal plate 50 connected to and supported by tower 47 and a threaded rod 52 rotatably journalled into bearings 53 at its top and bottom ends. An electric motor 54 is drivingly connected to threaded rod 52 in a conventional way to selectively rotate the rod in the clockwise and counterclockwise directions. As in the previous embodiment, elevator assembly 9 supports a platform assembly 12. The platform assembly includes an internally threaded bushing 57 (shown schematically in FIG. 7) that axially receives the threaded rod 52 through its center so that platform 12 is alternately raised or lowered depending on the direction threaded rod 52 is rotated. Platform assembly 12 will be described in greater detail below.

Upper chuck 6 is supported at the outer end of an arm 60 so that it is vertically aligned with lower chuck 5. Arm 60 is slidingly connected to metal plate 50 to be vertically adjustable for different lengths of roll core and so that it can be raised out of the way, for example by means of a winch, when a roll core is being installed prior to coating and then removed after coating. Arm 60 is initially raised out of the way as the roll core is installed prior to coating into lower chuck 5. The arm is then lowered until chuck 6 engages the roll core's axle 26. Arm 60 is then secured in place by means of one or more set screws 61 that tighten against plate 50 to lock the arm in position.

Welded or bolted to the top of tower 47 is a plate 66 which can be flanged 67 along its sides for additional strength. Plate 66 is apertured (not shown) for the connection of motor 54 to the upper end of threaded rod 52. A brace 70 is fixedly connected at one of its ends to plate 66. The brace's other end extends laterally from the plate to rotatably support the upper end of a vertically oriented spring shaft 78. The lower end of shaft 78 is journalled into a bearing 80 secured to the upper surface of base 46. Adjacent the shaft's upper and lower ends are respective ones of ring plates 82 fixedly connected to spring shaft 78 so that the ring plates and the shaft rotate together. Ring plates 82 are used to locate and to connect the inner ends of a vertically spaced apart pair of reference roller support arms 84 and 85 to spring shaft 78. The outer ends of support arms 84 and 85 are adapted for connection to the axle 89 of vertical reference roller 90, the purpose of which will be described in greater detail below. Briefly however, reference roller 90 replaces spacer wheel 20 in the previous embodiment for purposes of spotting mold tape 16 as its helically wound around the roll core to form the containment annulus for the polyurethane.

Spring shaft 78 is spring loaded or is otherwise resiliently biased so that support arms 84 and 85 and reference roller 90 supported by the arms are normally urged or biased in the counterclockwise direction. Reference roller 90 is therefore continuously biased against spacer disk 25 attached to the roll core's lower end as described above with respect to the embodiment of FIGS. 1 and 2.

Reference roller 90 can be a simple idler that passively rotates in response to the counter rotation of spacer disk 25, or one or both of support arms 84 and 85 can be fitted with a motor similar to motor 54 that rotates screw rod 52 so that reference roller 90 can be positively rotated for another control over the speed of application of mold tape 16 to form the containment sleeve 14 around the roll core.

In the alternative to biasing reference roller 90 against spacer disk 25, reference roller 90 can be supported or mounted in a way that allows it to be locked into a fixed position relative to the roll core. This can be done by means of clamps, set screws for any other means that will occur to those skilled in the art.

Figure 7:
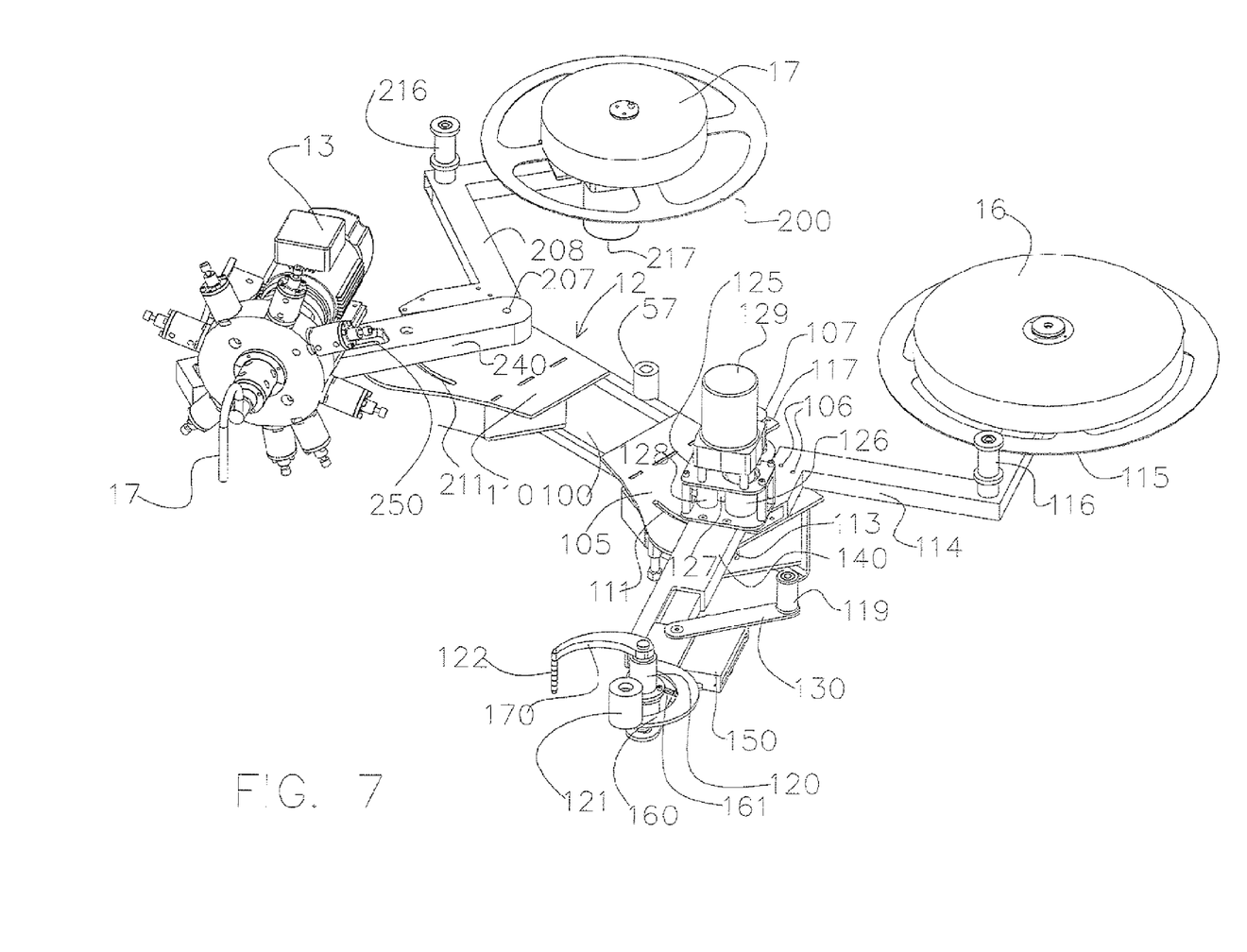
FIG. 7 is a front perspective view of the platform assembly portion of the apparatus of FIG. 3.
Figure 8:
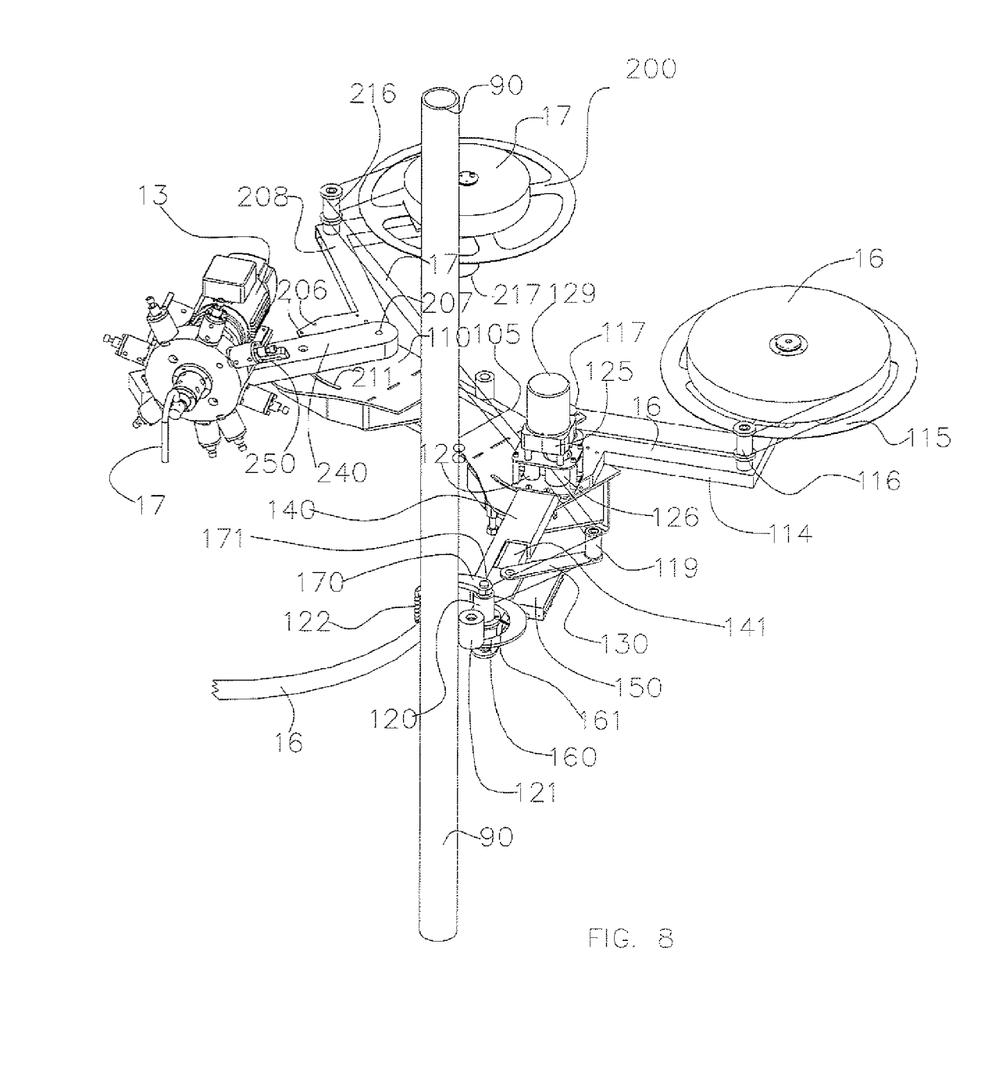
FIG. 8 is a front perspective view of the apparatus of FIG. 6 showing the path of travel for the mold tape.

Reference will now be made to FIGS. 7 and 8 showing platform assembly 12 in isolation. FIG. 7 shows the platform assembly itself, whereas FIG. 8 shows the platform assembly including mold tape 16 and the tape's path of travel.

The platform portion of the assembly includes a central plate 100 and two flanking lobes 105 and 110. Plate 100 includes bushing 57 that receives threaded rod 52 therethrough for up and down movement of platform assembly 12 in the manner described above.

Lobe 105 includes a supply reel 115 for mold tape 16 and a pivotably adjustable swing arm 140 for feeding the tape towards the roll core. Supply reel 115 is provided at the outer end of an arm 114 fixedly connected to lobe 105 such as by means of welds or fasteners 106.

Swing arm 140 is pivotably connected to lobe 105 by means of a pin 107 that can conveniently also serve as the axle for a tape guide roller 117. Lobe 105 includes a curved slot 111 for a threaded pin 113 connected to the underside of the swing arm. A nut (not shown) can be tightened along the pin against the lower surface of lobe 105 to lock swing arm 140 into the proper position relative to roll core 3. As mentioned above, roll cores come in different diameters and hence the need for the adjustability to the relative angle of the swing arm to the roll core.

The remaining components supported on swing arm 140 include a motorized tape drive 125, a pivotably mounted tensioning lever 130, an encoder 150 (in the nature of a potentiometer) that senses the pivoting movements of lever 130, a sickle shaped bogey arm 160 and a curved applicator arm 170.

Starting from tape supply reel 115, a roll of mold tape 16 is dropped onto the reel. The tape is fed around a first guide roller 116, second guide roller 117 and then into tape drive 125. The tape drive typically will include three rollers namely, a driven pinch roller 126 which rotates against an idler roller 127 which together nip the tape and feed it from reel 115, and a third idler roller 128 which acts as a guide for the tape's peeled away backing 17 which is eventually collected on a take-up reel 200 as will be described below.

The peeled mold tape is then threaded around guide roller 119 at the end of tension lever 130, and from there its wound around guide post 120 and guide rollers 121 and 122.

As shown most clearly in FIG. 8, bogey arm 160 is biased by a spring 161 towards reference roller 90 so that tape 16 is pinched between the reference roller and roller 121 at the end of bogey arm 160. The tape then follows the contour of reference roller 90 until it reaches the small diameter roller 122 at the end of applicator arm 170. Arm 170 is spring loaded to bias roller 122 against reference roller 90 substantially on the opposite side of roller 90 from guide roller 121. From roller 122, the tape is initially tacked or adhered to spacer disk 25 and then begins the helical winding from there as elevator assembly 9 is actuated to begin its elevation along the vertical length of roll core 3 to form containment sheath 14.

As will be appreciated, rollers 119, 121 and 122 are in contact with the sticky side of peeled mold tape 16. So that the tape easily releases as it feeds past these rollers, and to avoid a buildup of glue on their surfaces, the rollers are made of a material and/or treated to minimize the tack between the tape and the rollers. Given that different tapes will be coated with different glues, some empirical testing will be needed to chose the roller material and/or treatment that works best. Applicant has found that polymeric rollers made from silicone or Teflon™ are useful. The rollers can additionally be coated with silicone oil or silicone oil can be added to the silicone when fabricating the rollers. Rollers having a different composition or treated with other agents may provide equal or better results.

As mentioned previously, tension lever 130 is pivotably connected at its inner end 131 to spring arm 140. A potentiometer such as an encoder 150 measures the radial movement of lever 130 and generates a signal representative of that movement which is electrically communicated to a motor 129 (FIG. 8) drivingly connected to pinch roller 126 and idler 127 to control their rotational speed. If the tape is being fed too slowly for the rotational speed of roll core 3, tension lever 130 will rotate counterclockwise which will cause encoder to signal motor 129 to increase the rotational speed of rollers 126 and 127 to supply the tape at a faster rate. If the tape is being supplied too quickly, lever 130 will rotate in the clockwise direction, which will cause the encoder to slow the tape's feed rate. Swing arm 140 is adjustable lengthwise to accommodate roll cores of different diameters by means of a telescopic extension 141. Set screws (not shown) can be used to set the position of extension 141 so that rollers 121 and 122 are properly positioned relative to reference roller 90. The positioning of reference roller 90 can itself be adjusted by selecting support arms 84 and 85 of the correct length but this should seldom be necessary other than for roll core's having unusual dimensions.

Encoder 150 is a commercially available unit. Applicant has used a Panasonic™ potentiometer EVANF3R15B14 with good results.

Lobe 110 includes the take-up reel 200 for peeled tape backing 17 and an adjustable swing arm 240 that supports mixing head 13. Take-up reel 200 is provided at the outer end of an arm 208 fixedly connected to lobe 110 such as by means of welds or fasteners 206.

Swing arm 240 is pivotally connected to lobe 110 by means of a pin 207. Lobe 110 includes a curved slot 211 for a threaded pin connected to the underside of the arm 240. A nut (not shown) can be tightened along the pin against the lobe to lock arm 240 into its correct position relative to roll core 3. Arm 240 additionally includes a longitudinally extending slot 250 for a threaded pin that extends from the bottom of the mixing head. A nut (not shown) can be tightened along the pin against the bottom of arm 240 to adjust the position of the mixing head so that hose 17 is aligned to discharge the polyurethane into containment annulus 18.

As before, mixing head 13 is off the shelf technology and accordingly, no further description of the unit is being provided.

Peeled tape backing 17 exiting from tape drive 125 is threaded around guide roller 216 and then onto take-up reel 200. Reel 200 includes a small motor 217 that drives the reel at a speed calibrated to the rate at which the peeled backing is discharged from tape drive 125. When the reel is full, the peeled backing is removed and disposed of as waste.

The process for applying polyurethane to the outer surface of roll core 3 is substantially similar to the process described with respect to the embodiment of FIGS. 1 and 2, including the cleaning and preparation of the roll core itself.

Fresh mold tape 16 is threaded around rollers 116 and 117 and fed into tape drive 125 between pinch rollers 126 and 127. Backing 17 is peeled from the tape and is threaded around guide rollers 128 and 216 for collection on take-up reel 200.

Tape 16 is itself then threaded around roller 119 with its sticky side to the roller, around guide post 120 and then between roller 121 and the outer adjacent surface of reference roller 90. The sticky side of the tape at this point is against roller 121 and away from the surface of reference roller 90. The tape follows the circumference of reference roller 90 until it reaches roller 122.

As mentioned above, roller 122 is spring biased against the surface of reference roller 90 and reference roller 90 is itself spring biased against spacer disk 25. Tape 16 is therefore pinched between roller 122 and reference roller 90 with its sticky side towards roller 122.

At start up, roller 90 is pressing against spacer disk 25 and roller 122 is located just above the spacer disk so that the peripheral vertical edge of the disk and the surface of roller 122 pressing against reference roller 90 are vertically aligned. The leading edge of tape 16 is attached to the outer peripheral edge of the spacer disk such as by means of the tape's own glue, or using a clip, nail, tack or any other suitable means.

To facilitate the positioning of roller 122 at start up above the spacer disk and so that the roller isn't pinched between roller 90 and disk 25, applicator arm 170 can be lifted vertically. In this regard, applicator arm is mounted on a small shaft 171 that is pivotally anchored into guide post 120. A spring (not shown) inside the guide post not only biases arm 170 against reference roller 90, but allows arm 170 to be lifted enough to clear disk 25 at start up. The spring will normally bias arm 170 into the downwardly retracted position shown in FIGS. 7 and 8 as the platform assembly begins its ascent so that tape 16 slips into the pinch between roller 122 and roller 90 as the ascent continues for the formation of sheath 14.

Roll core 3 is rotated in concert with the actuation of tape drive 125 with platform assembly 12 remaining in its lowered position to wind tape 16 around spacer disk 125 at least once or twice to insure a strong connection to the disk and to build up the right amount of tension in the tape as determined by encoder 150.

Figure 9:
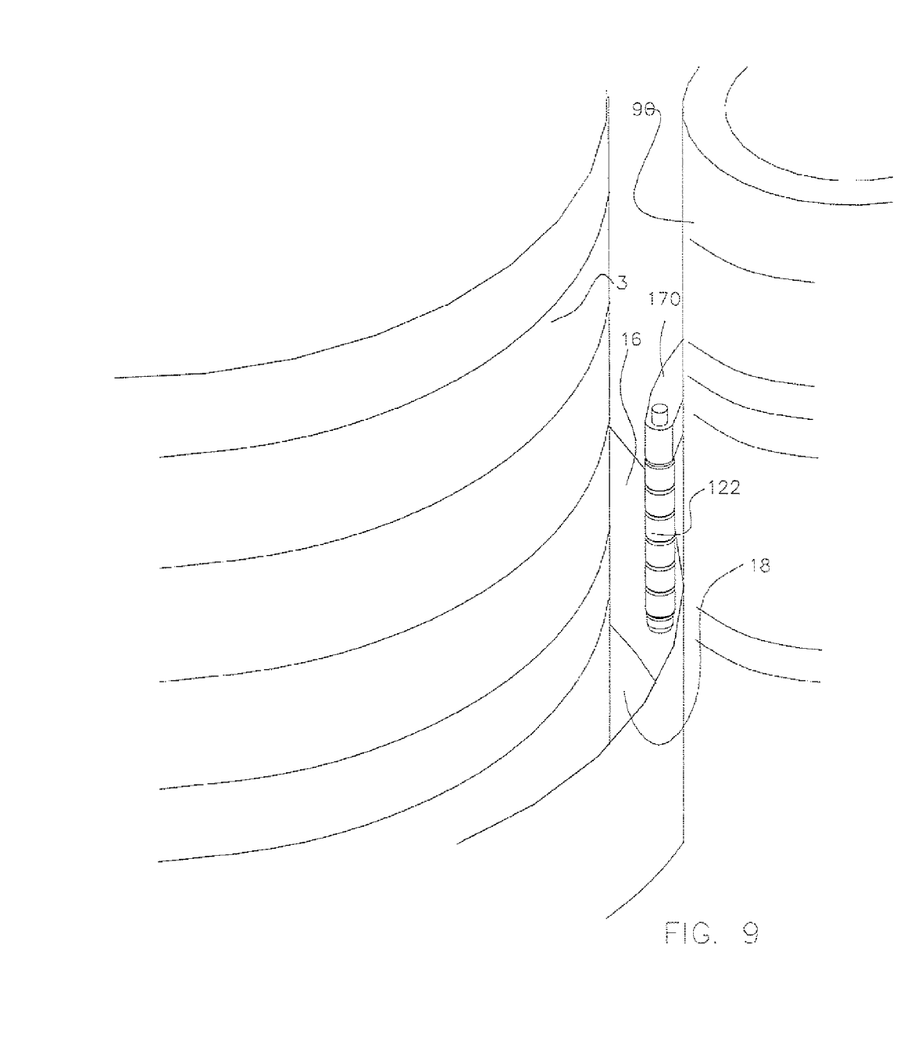
FIG. 9 is a perspective view showing the mold tape being wound helically in an overlapping manner adjacent the roll core.

Elevator assembly 9 is then activated which causes platform assembly 12 to be slowly raised from its lowered position. Tape 16 as it releases from roller 122 accretes onto previously discharged tape to be wound helically in an overlapping manner over the length of the roll core from the bottom to the top thereof. The sticky side of the tape faces towards the roll core so that each winding of tape adheres to the previous winding where they overlap. As before, the amount of overlap is determined by the rate of upward movement of the platform assembly 12 per rotation of the roll core, and the width of the tape used. The width of containment annulus 18 is determined by the difference in diameter between spacer disk 25 and roll core 3.

Again as described above, mixing head 13 simultaneously pours a liquid polyurethane mixture with or without a catalyst into the containment annulus. Obviously, the pouring does not begin until the lowermost portion of containment sheath 14 is formed around the roll core, but the pouring is preferably continuous from that point on. The polyurethane is discharged from hose 17 as smoothly and continuously as possible to avoid the formation of bubbles or other irregularities in the pour.

The completion of the process is substantially the same as described above. Platform assembly 12 can then be lowered in readiness for the next roll core. Platform assembly 12 has been described as supporting both the tape dispenser and the mixing head. A separate platform can be provided for each if so desired.

The above-described embodiments of the present invention are meant to be illustrative of preferred embodiments of the present invention and are not intended to limit the scope of the present invention. Various modifications, which would be readily apparent to one skilled in the art, are intended to be within the scope of the present invention. The only limitations to the scope of the present invention are set out in the following appended claims.

The embodiments of the invention in which an exclusive property or privilege is claimed are defined as follows:

1. An apparatus for covering a cylindrical roll core with an elastomeric material, the roll core having a longitudinal axis of rotation and an outer surface for receiving said elastomeric material thereon, the apparatus comprising:
   a pair of opposed vertically aligned rotatable chuck means for receiving and securing said roll core therebetween for rotation of said roll core about its longitudinal axis, said chuck means holding said roll core vertically stationary;
   means for dispensing and helically winding a length of flexible tape around said roll core from the bottom to the top thereof in spaced apart relation to said roll core's outer surface to form a containment sheath defining an annular space between said outer surface and said tape, said tape being wound in response to rotation of said roll core by said chuck means;
   discharge means for discharging said elastomeric material into said annular space concurrently with said space's formation as said flexible tape is wound around said roll core;
   support means for said means for dispensing and said discharge means for vertical movement thereof relative to said roll core; and
   motor driven means for controllably moving said support means up and down relative to said roll core.

2. The apparatus of claim 1 wherein said means for dispensing comprises means for spacing said flexible tape a predetermined distance from said roll core's outer surface.

3. The apparatus of claim 2 wherein said means for spacing comprise a first surface located at said predetermined distance from said roll core's outer surface, said first surface positioning said tape for said helical winding thereof about said roll core.

4. The apparatus of claim 3 wherein said first surface is normally biased against a second surface with said tape moving between said first and second surfaces prior to the formation of said containment sheath.

5. The apparatus of claim 4 wherein said second surface is maintained at said predetermined distance away from said roll core'outer surface.

6. The apparatus of claim 5 wherein said first surface is the surface of a first rotatable roller and said second surface is the surface of a second roller, said tape being pinched between said first and second rollers to align the tape for helical winding around said roll core.

7. The apparatus for claim 6 wherein said second roller is supported to be vertically coextensive with said roll core in parallel spaced apart relation thereto.

8. The apparatus of claim 7 including means for maintaining said second roller at said predetermined distance from said roll core's outer surface.

9. The apparatus of claim 8 wherein said means for maintaining comprise a circular disk arranged coaxially with said roll core adjacent a lower end thereof for co-rotation with said roll core, said circular disk having a diameter exceeding the diameter of said roll core, the difference in diameters defining the width of said annular space between the roll core's outer surface and said tape.

10. The apparatus of claim 9 wherein said second roller is normally biased against said circular disk to maintain said second roller at said predetermined distance from said roll core's outer surface.

11. The apparatus of claim 10 wherein said first roller moves vertically past said second roller as said motor driven means move said support means from the bottom to the top of said roll core.

12. The apparatus of claim 11 wherein said means for dispensing include a supply of tape, a tape drive for feeding said tape from said supply thereof to said first and second rollers, means for sensing tension in the tape and means responsive to said sensing means for controlling the rate at which said tape drive feeds said tape to said first and second rollers.

13. The apparatus of claim 12 wherein said means for sensing comprise a pivotable lever, a guide roller on said lever for engaging said tape, said lever pivoting in response to the tension in said tape, and a sensor to sense the pivoting movement of said lever and to produce a signal representative of that movement that is communicated to said tape drive to speed up or slow down the rate at which said tape is being fed to maintain said tension within a predetermined range.

14. The apparatus of claim 13 wherein said tape is connected to said circular disk and wound therearound at least once prior to activation of said motor driven means.

15. The apparatus of claim 14 wherein said tape is a paper tape coated on one side thereof with an adhesive and a peelable backing protecting said adhesive prior to use.

16. The apparatus of claim 15 including a reel for collection of said peelable backing after separation from said tape.

17. The apparatus of claim 1 wherein said discharge means is a mixing head for mixing said elastomeric material therein prior to discharge into said annular space.

18. The apparatus of claim 1 wherein said elastomeric material is a thermoset material.

19. The apparatus of claim 18 wherein said thermoset material is selected from the group consisting of urethane, polyurethane, epoxy, silicone, silicone rubber and mixtures thereof.

20. The apparatus of claim 11 wherein said first roller is polymeric and said second roller is metallic.

21. The apparatus of claim 20 wherein said circular disk defines a bottom surface of said containment sheath for containment of said elastomeric material.

22. The apparatus of claim 1 wherein said pair of vertically aligned rotatable chuck means comprise a first lower chuck and a second upper chuck, motor means drivingly connected to at least first said lower chuck for rotation thereof, said second upper chuck being vertically adjustable to vary the distance between said first and second chucks for securing roll cores of different lengths and to facilitate the installation and removal of roll cores from said apparatus.

* * * * *